United States Patent [19]

Clegg

[11] 4,032,173
[45] June 28, 1977

[54] WHEELED CARRIERS

[76] Inventor: John Dennis Clegg, Old Garden, 205A Banbury Road, Stratford-upon-Avon, Warwick, England

[22] Filed: Oct. 3, 1975

[21] Appl. No.: 619,363

[30] Foreign Application Priority Data

Oct. 4, 1974 United Kingdom ............ 43046/74

[52] U.S. Cl. .............................................. 280/650
[51] Int. Cl.$^2$ ........................................ B62B 11/00
[58] Field of Search .......... 280/642, 644, 647, 650, 280/39

[56] References Cited

UNITED STATES PATENTS

| | | | |
|---|---|---|---|
| 1,200,563 | 10/1916 | Wiser | 280/39 |
| 2,886,337 | 5/1959 | Quisenberry | 280/650 |
| 3,326,570 | 6/1967 | Burnham | 280/648 |
| 3,443,823 | 5/1969 | Perego | 280/650 |

*Primary Examiner*—Robert R. Song
*Attorney, Agent, or Firm*—Friedman, Goodman & Teitelbaum

[57] ABSTRACT

A wheeled carrier such as a stroller comprising a frame having a base provided with wheels and a collapsible support movable between an erected position wherein it extends upwardly from the base and a collapsed position wherein it lies generally flat on the base, and a collapsible seat which is supported by a part of the support movable between an erected position to position the seat for use when the support is erected and a collapsed position to collapse the seat when the support is collapsed.

The invention provides locking means such as toggle mechanisms connected between parts of the support and operable to lock the support in the erected position by movement of the seat-supporting part downwardly towards its erected position and releasable to permit collapsing of the support by movement of the seat-supporting part upwardly towards its collapsed position.

The support comprises frame members pivotally connected together and to the base. The base comprises two spaced members having pivotally mounted thereon two independent collapsible wheel-carrying structures, and the base members are held in fixed spaced-apart relation by the frame members pivotally connected thereto.

8 Claims, 4 Drawing Figures

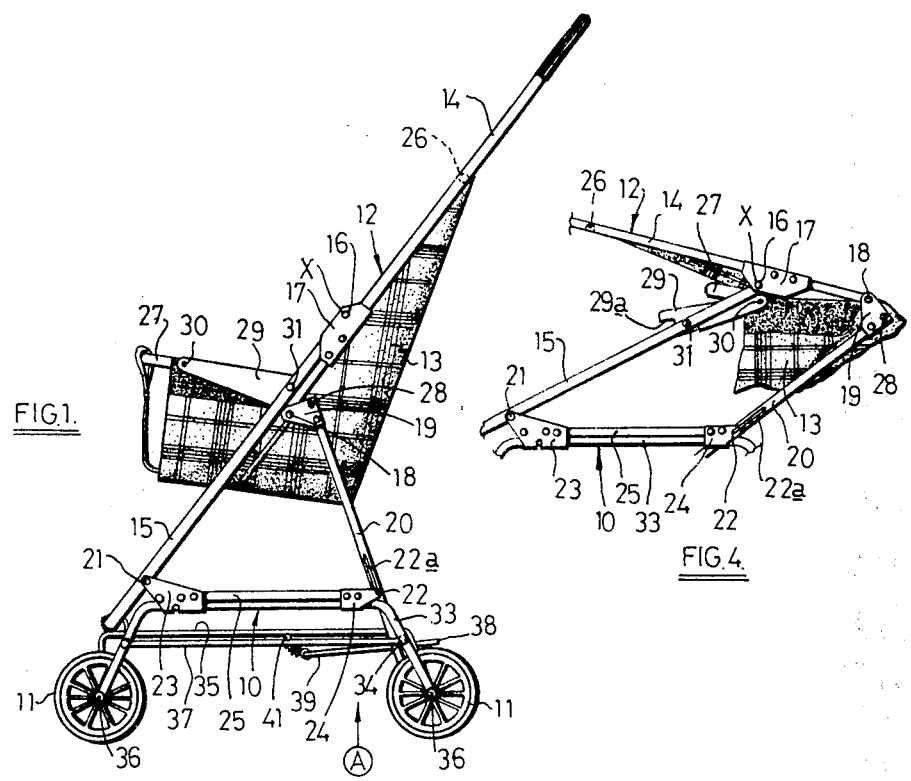
FIG.1.
FIG.4.
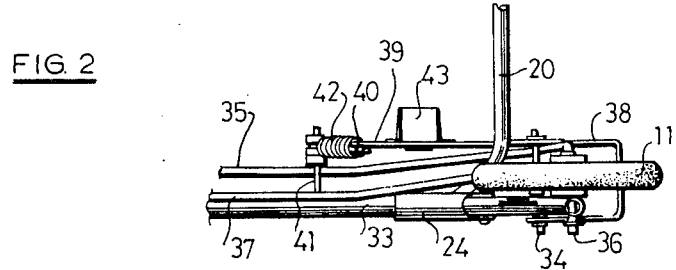
FIG.2
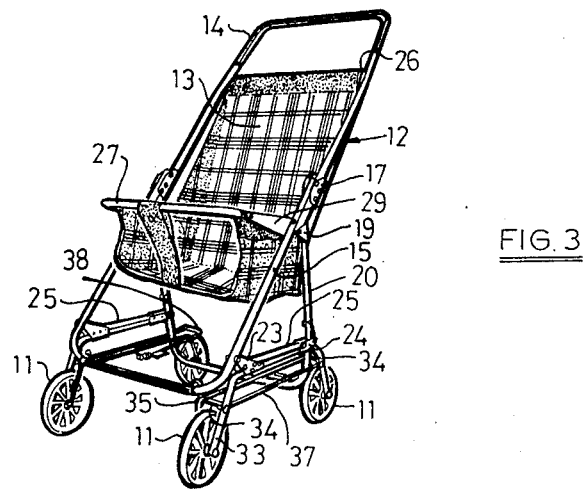
FIG.3

WHEELED CARRIERS

BACKGROUND OF THE INVENTION

1. Field of the Invention

This invention relates to wheeled carriers for children, for example strollers and baby carriages.

In particular, the invention is concerned with a wheeled carrier of the kind comprising a frame which has a base provided with ground-engaging wheels and a collapsible support which is movable between an erected position wherein it extends upwardly from the base and a collapsed position wherein it lies generally flat on the base, and a seat which is supported by the support and arranged to be positioned for use when the support is erected, locking means being provided for releasably locking the support in the erected position.

More specifically, the invention is concerned with such a wheeled carrier of the kind in which the seat is collapsible and is supported by a part of the support which is movable between an erected position to position the seat for use when the support is erected and a collapsed position to collapse the seat when the support is collapsed.

2. Description of the Prior Art

The known forms of locking means used in wheeled carriers of the kind specified have the disadvantage that they are liable accidentaly to be released when a child is occupying the carrier with the result that the support may collapse and injure the child.

The object of the present invention is to provide a simple and easily operable and releasable locking means for a wheeled carrier of the kind specified, which safely locks the support of the carrier in the erected position.

SUMMARY OF THE INVENTION

According to the invention there is provided a wheeled carrier of the kind specified wherein the locking means is operable to lock the support in the erected position by movement of the part of the support supporting the seat towards its erected position and is releasable to permit collapsing of the support by movement of said part of the support towards its collapsed position.

Preferably the seat-supporting part is movable downwardly to its erected position and upwardly to its collapsed position and the seat is arranged so that the weight of a child occupying it urges the said part of the support downwardly to its collapsed position whereby the locking means is maintained in its operative position.

The arrangement is that a user can easily operate and release the locking means simply by moving the seat-supporting part, movement of this part being necessary in any event in erection and collapsing of the support. When a child is occupying the seat of the carrier, there is no danger of the support accidentally collapsing and injuring the child since the weight of the child acts to maintain the locking means in the operative position. The locking means cannot be moved to the released position whilst a child is occupying the seat of the carrier.

Preferably the locking means comprise at least one toggle mechanism connected between parts of the support and movable by means of the seat-supporting part between an operative position to lock the support in the erected position and a released position to permit collapsing of the support.

According to a further feature of the invention there is provided a wheeled carrier of the kind specified wherein the base comprises two spaced members carrying the ground-engaging wheels and the support comprises two frame members which are connected to the base members for pivoting relative thereto about two spaced parallel axes extending transversely with respect to the base members between an erected position in which they extend upwardly from the base and a collapsed position in which they lie flat on the base, the frame members acting to maintain the base members in fixed spaced-apart relation.

Preferably each base member has pivotally mounted thereon a structure carrying two wheels, the structure being pivotable relative to the base member about an axis perpendicular to the axis of pivoting of the frame members relative to the base members between an operative position in which the wheels are positioned for engagement with the ground and a collapsed position in which the structure and the wheels lie generally flat against the base and the collapsed support.

Thus, the carrier is of a simple construction, the base consisting merely of two spaced members which serve to carry both the collapsible support members and the collapsible wheel structures.

BRIEF DESCRIPTION OF THE DRAWINGS

The invention will not be described, by way of example, with reference to the accompanying drawings, in which:

FIG. 1 is a side elevation of one form of stroller embodying the invention;

FIG. 2 is an underneath plan view of part of the stroller taken in the direction of arrow A in FIG. 1;

FIG. 3 is a general perspective view of the stroller; and

FIG. 4 is a side elevation of the support of the stroller showing it partially collapsed.

DESCRIPTION OF THE PREFERRED EMBODIMENT

The stroller illustrated in the drawings comprises a frame having a base generally designated 10 which is provided with four ground-engaging wheels 11 arranged two at each side thereof, and a collapsible support generally designated 12 which is movable between an erected position in which it extends upwardly from the base and a collapsed position in which it lies generally flat on the base. The support carries a collapsible bucket-type seat 13 arranged to be positioned for use when the support is erected.

The support 12 includes upper and lower parts constituted respectively by an inverted U-shaped member 14 and a U-shaped member 15 which are connected together for pivoting relative to one another about a horizontal axis X between an erected position in which they lie generally in a common plane disposed at an inclination to the horizontal as shown in FIGS. 1 and 3, and a collapsed position in which they are folded generally flat one on top of the other and both on top of the base 10, the support being shown partially collapsed in FIG. 4. The pivots between the two members 14 and 15 comprise two pins 16 passing through the respective free ends of the lower member 15 and through U-section brackets 17 fixed to and embracing the limbs of the upper member 14 at locations spaced from its free ends. The free ends of the portions of the upper member 14 which extend below the brackets 17, are pivotally connected by pins 18 to U-section brackets 19 fixed to and embracing the free ends of a further U-shaped member 20 forming part of the support 12. The upper member 14 is therefore pivotable relative to the member 20 about a horizontal axis parallel to the axis X.

The two U-shaped members 15 and 20 are pivotally connected at locations spaced from their cross parts and by means of pivot pins 21 and 22 to U-section brackets 23 and 24 fixed to two straight members 25 disposed at the respective sides of the stroller and constituting the base 10 of the frame. The members 15 and 20 are therefore pivotable relative to the base members 25 about two spaced axes parallel to the axis X and at right angles to the members 25. Each pivot pin 22 has an upwards extension 22a, the upper end of which is bent inwardly and passes through the relevant limb of the U-shaped member 20 to reinforce the pivot pin.

When the support 12 is erected, the members 15 and 20 together form a triangular structure as viewed from the side of the stroller with the member 14 extending upwardly from the structure and providing a handle for propulsion of the stroller. On collapsing of the support, the members 14, 15 and 20 pivot relative to one another and relative to the base 10 about the aforesaid axes into positions in which the members 14 and 15 lie generally flat on top of the base as described above and the member 20 is disposed generally in the same plane as the base.

The bucket-type seat 13 is made of a flexible material, e.g., plastics coated cloth, and is supported at its upper end by a cross member 26 extending between the limbs of the upper member 14 and at its front and sides by a U-shaped seat-supporting member 27. This seat member 27 is pivotally connected at its free ends by pivot pins 28 to the brackets 19 fixed to the U-shaped member 20 so that it is pivotable about a horizontal axis parallel to the axis X between an erected substantially horizontal position in which it positions the seat for use, and a collapsed position in which it lies within the confines of the collapsed member 14 and 15 and the seat is collapsed. The seat has two openings at the front through which project the legs of a child sitting in the seat.

A link 29 comprising a plate is pivotally connected at one end by a pivot pin 30 to each limb of the U-shaped seat member 27 and at the other end by a pivot pin 31 to the adjacent limb of the U-shaped lower member 15. Each link 29 and that portion of the adjacent limb of the U-shaped seat member 27 between the pivot pin 30 and the pivot pin 28 together constitute the two links of an over-centre toggle mechanism for locking the frame in its erected position.

The arrangement is that, in order to collapse the stroller, the user first grasps the cross part of the U-shaped seat member 27 with one hand and pulls it upwardly to release the two toggle mechanisms simultaneously, the user holding the pushchair firmly in position by placing his or her foot on the cross part of the member 15 or 20 and his or her other hand being free to hold the child. Release of each of the mechanisms is effected by the link which is constituted by a portion of the relevant limb of the seat member 27, moving from the lower side to the upper side of the pivot pin 31 of the relevant link 29 whereupon the resistance to upwards movement of the seat member provided by the over-center arrangement ceases and the seat member is then free to move further upwards to its collapsed position. The cross part of the upper member 14 is then grasped by the user and the member is swung about its pivotal connections 16 to the lower member 15, i.e., the horizontal axis X, with the result that the members 15 and 20 are swung apart about their pivotal connections 21 and 22 to the base 10. This causes the various parts to pass through the stage shown in FIG. 4 until they reach a position in which the upper member 14 lies flat upon the lower member 15 which in turn lies flat upon the base members 25, and the member 20 is disposed generally in the same plane as the members 25. The U-shaped seat member 27 is moved fully to its collapsed position by the movement of the member 14 and the seat 13 is collapsed. The frame and the seat therefore form a compact, generally flat pack.

To re-erect the stroller, the user grasps the cross parts of the frame members 14 and 15 and pulls the members apart into the erected position. The seat member 27 is then pressed down into its operative position, and thereby operates the toggle mechanisms to lock the frame in the erected position.

The arrangement is that when a child is sitting in the seat 13, his or her weight urges the seat member 27 downwardly and therefore maintains the toggle mechanisms in their operative positions so that there is no danger of the stroller collapsing when in use. Stops 29a provided on the links 29 are arranged to engage beneath the pivot pins 28 to limit the extent of downwards movement of the seat member 27 thereby to maintain it in its erected substantially horizontal position.

Turning now to the mounting of the wheels 11 on the base 10, the brackets 23 and 24 fixed to the two base members 25 at the sides of the stroller provide hinged connections to the base of two structures each carrying two wheels. Each structure includes a main member 33 substantially of inverted U-shaped and the U-section brackets 23 and 24 of the relevent base member 25 are arranged to embrace this member 33 so that the latter is turnable therein about an axis perpendicular to the axis X. The two wheel-carrying structures are therefore pivotable about the hinge brackets 24 and 32, between an erected position as shown in FIGS. 1 and 3 in which the wheels 11 are positioned for engagement with the ground, and an inwardly collapsed position in which the wheels and the structures lie flat against the underside of the pack formed by the collapsed frame and seat.

The member 33 of each wheel carrying structure has fixed to its depending end portions at locations spaced from the free ends of the member two cross members 34 which extend inwardly above the wheels 11 of the structure and have fixed to their inner ends a further member 35 which is likewise generally of inverted U-shape and extends alongside the member 33. This member 35 has its end portions bent inwardly and attached to the lower free ends of the member 33 to form axles 36 on which the wheels are rotatably mounted. Thus, the axle 36 of each wheel of each structure is supported between two legs constituted by the relevant end portions of the members 33 and 35 of the structure, and the cross member 34 above the wheel and the legs and the axle together form a rigid generally rectangular structure which provides a firm and stable mounting for the wheel. A longitudinal member 37 extends between and is fixed at its ends to, the two cross members 34 of each wheel-carrying structure, the member 37 being spaced from and substantially parallel to the member 35.

The U-shaped frame member 20 is arranged to extend between the members 35 and 37 of each wheel-carrying structure and the arrangement is that on collapsing of the frame the curved portions of the member 20 joining its cross part to its limbs exert a camming action on the members 35 and 37 of both wheel-carrying structures and thereby automatically move the structures from their operative positions to their collapsed positions. On erection of the pushchair, the member 20 likewise exerts a camming action on the members 35 and 37 to return the wheel-carrying structures to their operative positions.

Thus, it will be seen that the whole pushchair can be collapsed by two simple actions — firstly movement of the seat member 27 to release the toggle mechanisms, and secondly movement of the member 14 to collapse both the support 12 and the wheels 11.

Braking means are provided for braking one of the wheels of the stroller. These breaking means comprise a U-shaped element 38 the free ends of which are pivotally mounted on the adjacent cross member 34 whereby the element is movable between a raised position clear of the wheel and a lowered position in which its cross part engages the tyre of the wheel thereby to brake the latter. The inner limb of the element 38 is provided with an extension 39, the free end of which is pivotally connected by a pin and slot connection to one end of a short link 40, the other end of which is pivotally connected to a cross member 41 secured to the members 35 and 37. A spring 42 is arranged to urge the pin which is carried by the extension 39 to one end of the slot which is formed in the link 40 so that the extension and the link are normally maintained at an angle to one another with the brake element either in its raised inoperative position or in its lowered operative position. To apply the brake, the user depresses the brake element 38 by means of his or her foot so that it engages the wheel, the pin moving to the other end of the slot and back against the action of the spring 42 as the extension 39 swings the link 40 from an upper inclined position to a lower inclined position. To release the brake, the user depresses a pedal 43 provided on the extension 39, the pin and slot connection enabling the link 40 to be moved back to its upper inclined position as the brake element 38 is raised.

If desired, a similar braking means may be provided for the other wheel at the same side of the stroller, and in this event the two braking means may be operable in unison. Braking means may also be provided for the two wheels at the other side of the stroller.

The various members of the frame are made of aluminum tubing so that the stroller is light in weight.

I claim:

1. In a wheeled carrier of the kind comprising a frame which has a base provided with ground-engaging wheels and a collapsible support which is mounted on the base and is movable between an erected position wherein it extends upwardly from the base and a collapsed position wherein it lies generally flat on the base, a collapsible seat for a child which is supported by a part of the support movable between an erected position to position the seat for use when the support is erected and a collapsed position to collapse the seat when the support is collapsed, and locking means connected between parts of the support for releasably locking the support in the erected position, the improvement wherein the seat-supporting part of the support is operatively connected to the locking means to operate the locking means to lock the support in the erected position on movement of the seat-supporting part towards its erected position and to release the locking means to permit collapsing of the support on movement of the seat-supporting part towards its collapsed position, and the support comprises a first part which is connected to the base for pivoting relative thereto about a first horizontal axis, a second part which is connected to the upper end of the first part for pivoting relative thereto about a second horizontal axis parallel to said first horizontal axis, and a third part which is connected to the base for pivoting relative thereto about a third horizontal axis spaced from and parallel to said first horizontal axis, the second part having a portion which extends downwardly from its pivotal connection to the upper end of the first part and which is connected to the upper end of the third part for pivoting relative thereto about a fourth horizontal axis spaced from and parallel to said second horizontal axis, whereby the three parts of the support are movable between an erected position in which the first and second parts lie generally in a common plane disposed at an inclination to the horizontal and the first and third parts together form a structure of triangular form from which the second part extends upwardly, and a collapsed position in which the three parts are folded generally flat on top of the base.

2. A wheeled carrier as claimed in claim 1 wherein the locking means comprise at least one toggle mechanism connected between the upper end of the third part and the upper end portion of the first part at a location spaced downwardly from the pivotal connection of the second part thereto, the seat-supporting part being operatively connected to the toggle mechanism to move it between an operative position to lock the support in the erected position and a released position to permit collapsing of the support, and the toggle mechanism being arranged, when moved to its operative position, to draw the upper end of the third part and hence the said downwardly extending portion of the second part towards the upper end portion of the first part and, when in its operative position, to lock together the said downwardly extending portion of the second part and the upper end portion of the first part.

3. A wheeled carrier as claimed in claim 2 wherein the seat-supporting part is connected to the upper end of the third part for pivoting relative thereto about a horizontal axis parallel to said fourth horizontal axis, and the toggle mechanism comprises a link which is pivotally connected at its respective ends to the upper end portion of the first part at said location spaced downwardly from the pivotal connection of the second part thereto and to the seat-supporting part at a location spaced from its pivotal connection to the third part, and that portion of the seat-supporting part between its pivotal connection to the upper end of the third part and the pivotal connection of the link thereto, the seat-supporting part being pivotable relative to the third part through an over-center position relative to the pivotal connection of the link to the first part because its erected and collapsed positions.

4. A wheeled carrier as claimed in claim 3 wherein the seat-supporting part comprises a U-shaped member the free ends of which are pivotally connected to the upper end of the third part at opposite sides of the carrier and each of which has an associated toggle mechanism, whereby the two mechanisms are operable and releasable in unison by movement of the seat-supporting part.

5. A wheeled carrier as claimed in claim 1 wherein the base comprises two spaced members carrying the ground-engaging wheels and the first and third parts of the support comprise two frame members pivotally connected to the base members so that their axes of pivoting relative thereto extend transversely with respect to the base members, the frame members acting to maintain the base members in fixed spaced-apart relation.

6. A wheeled carrier as claimed in claim 5 wherein the two frame members constituting the first and third parts of the support are each constituted by a U-shaped member, the two limbs of which are pivotally connected to the respective base members at opposed locations adjacent to the cross part of the member, and the second part of the support comprises a member of inverted U-shape the limbs of which are pivotally connected to the respective limbs of each of the first and third frame members.

7. A wheeled carrier as claimed in claim 5 wherein each base member has pivotally mounted thereon a structure carrying two wheels, the structure being pivotable relative to the base member about a horizontal axis perpendicular to said first and third horizontal axes between an operative position in which the wheels are positioned for engagement with the ground and a collapsed position in which the structure and the wheels lie generally flat against the base and the collapsed support, the third part of the support being arranged on erection and collapsing of the support to exert a camming action on the two wheel structures to move them to the operative and collapsed positions respectively.

8. A wheeled carrier as claimed in claim 7 wherein each wheel structure comprises two members generally of inverted U-shape which are arranged side-by-side and one of which is pivotally connected to the associated base member, the free ends of one of said two members having integral lateral extensions which are attached to the respective free ends of the other member and form axles for the two wheels of the structure, and cross members being provided between the two members above the wheels.

* * * * *